Dec. 24, 1929.  J. A. BROGAN  1,740,451
TRIMMING MACHINE
Filed June 4, 1925   2 Sheets-Sheet 1

INVENTOR
James A. Brogan
By his Attorney,
Nelson W. Howard

Patented Dec. 24, 1929

1,740,451

UNITED STATES PATENT OFFICE

JAMES A. BROGAN, OF LAWRENCE, MASSACHUSETTS, ASSIGNOR TO UNITED SHOE MACHINERY CORPORATION, OF PATERSON, NEW JERSEY, A CORPORATION OF NEW JERSEY

TRIMMING MACHINE

Application filed June 4, 1925. Serial No. 34,894.

This invention relates to trimming machines and is herein illustrated as embodied in a machine for trimming the overflow from molded and vulcanized rubber heels.

Such heels are made by placing blanks of unvulcanized rubber or rubber compound in molds and subjecting them to heat and pressure. In order to insure that the molds shall be completely filled, the blanks are made a little oversize. Consequently, during the subjection of the blanks to heat and pressure, more or less rubber overflows into the spaces between the parts of the mold; and at the end of the operation, this overflow has become thin lips or fins of vulcanized rubber which project from the top and bottom faces of the heel and must be trimmed off before the heel is applied to a shoe.

The general object of the present invention is to provide an improved trimming machine which will be suitable for operating upon rubber heels and similar articles to trim off the overflow.

Machines for this purpose commonly comprise an upper cutter, which may be either of the reciprocating or the rotating type, a cooperating shear member, which is commonly a rotary disk, and a work support over which the work is fed, said work support being angularly adjustable about a substantially horizontal axis passing close to the locality in which the cutter and shear member overlap. According to one feature of the present invention, a work-guiding member is arranged wholly behind but tangent to the plane of the shearing cut and at the feeding-in side of the cutting locality, so that the body of an article of work presented to the cutting means in front of said plane will be guarded against injury by the cutting means. At the same time, the work-guiding member is arranged so that the fin of overflow may project across the shearing plane and be severed flush or nearly flush with the body of the article. Preferably, the work-guiding member is in the form of a wheel or roll and provided with means for driving it to aid the operator in feeding the work so as to speed up the operation of the machine. And preferably this wheel is driven by cooperating friction members, means being provided for varying the pressure of the friction members upon each other so that the force of the feeding action of the feed wheel may be varied.

In order still further to facilitate the feeding of the work, another feature of the invention comprises a feed member carried by the work support and adapted to engage the under face of the work, said member being driven by mechanism constructed and arranged to permit the work support to be adjusted into different positions as may be desired.

These and other features of the invention including certain details of construction and combinations of parts will be described as embodied in an illustrative machine and pointed out in the appended claims.

Referring now to the accompanying drawings.

Figure 1:
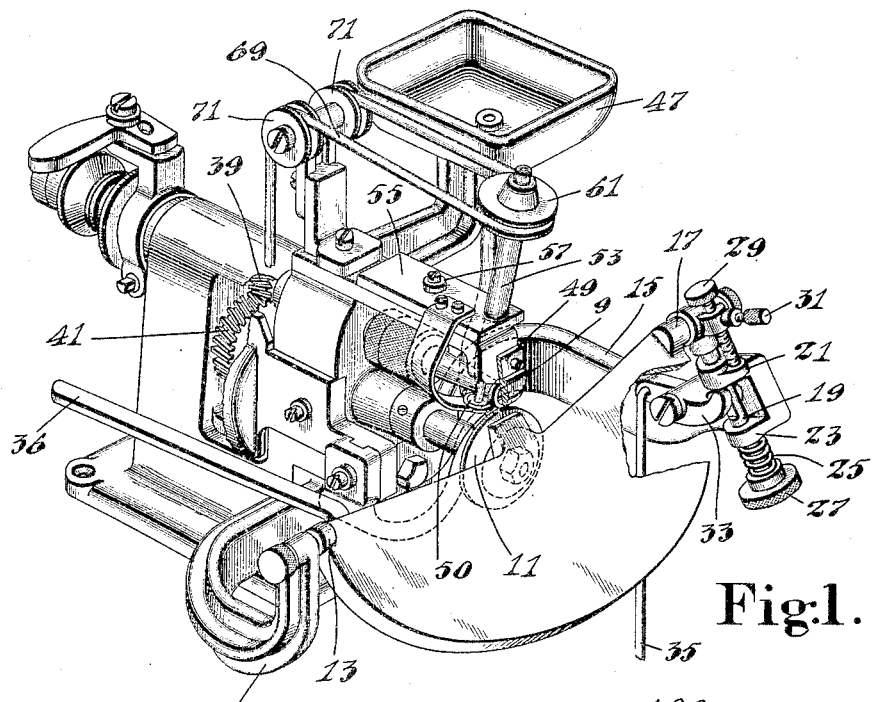
Figure 1 is a perspective of a machine in which the present invention is embodied.
Figures 2, 3:
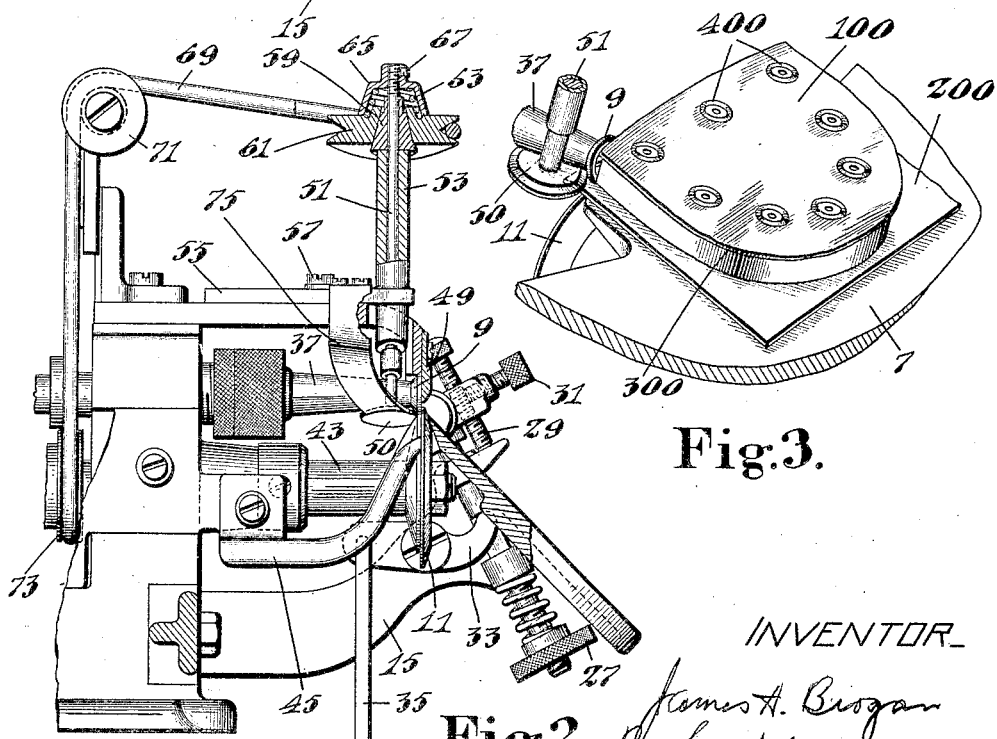
Figure 2 is a front elevation of the working parts of the machine.
Figure 3 is a perspective showing a rubber heel in process of being trimmed on the machine of Figures 1 and 2.

Referring first to Figures 1 to 3, the machine comprises a work table 7 angularly adjustable about a substantially horizontal axis which passes substantially through the locality at which the rotary disk cutters 9, and 11 overlap. The table has at its left-hand end as viewed in Figure 1 a socket 13 to receive the rounded end of a trunnion projecting from a yoke 15 which is fast to the frame of the machine. At its other end, the table is provided with a socket 17 to receive the rounded end of a trunnion projecting from a small rod 19 which is slidable up and down in spaced bosses 21, 23 formed integral with another arm of the yoke 15. A coiled spring 25, the tension of which may be varied by turning a thumbscrew 27 on the rod 19, pulls down the rod, and with it one end of the table 7 as far as an adjustable stop screw 29 permits. This stop screw is threaded through a boss on the upper end of the rod 19 and is held in adjusted position by a set screw 31. A lifting lever 33, pivoted on a stud carried by the yoke 15, has a forked forward end arranged to straddle a flattened portion of the rod to engage lifting shoulders as shown in Fig. 2, said lever having pivoted to its rear end a treadle rod 35. With this construction the far end of the table may be raised at any time by depressing the treadle (not shown) which is connected with the lower end of the treadle rod. It should be noted that the raising and lowering of the far end of the table effects a bodily movement up and down of the heel which, when being trimmed, occupies a position on the table about midway between the arms of the yoke 15 and adjacent to the cutters. The table 7 is normally supported at the angle shown in Fig. 2 by a stop (not shown), but is provided with a handle 36 (Fig. 1) by which it may be tilted about the axis of the trunnions in the sockets 13, 17.

The upper cutter 9 is fast to a horizontal shaft 37 which carries at its rear end the usual fast and loose pulleys. Fast to this shaft midway between its ends is a small spiral gear 39 which meshes with a larger spiral gear 41 fast to the shaft 43 of the lower cutter or shear member 11. It will be noted that the upper cutter 9 is of much smaller diameter than is the lower cutter; and the sizes of the gears 39 and 41 are such that the cutters are rotated at substantially the same peripheral velocity. In order to lubricate the cutters, a pipe 45 leads to the lower cutter from an open reservoir 47 in which water or oil or a mixture of the two is held.

As thus far described, the machine is or may be substantially like the machine disclosed in United States Letters Patent No. 1,534,257 which resulted from my prior application Serial No. 569,800, filed June 21, 1922, and will not be further described in detail. It will be understood, however, that, in the operation of the machine, the operator places a rubber heel 100 with its heel-seat face upon the table 7 and presents to the cutters the fin or overflow 200; and then turns the heel over and presents to the cutters the fin or overflow 300. Inasmuch as there are commonly on the tread face of the heels projections such as the rings 400 which surround the nail holes, it is necessary to change the level of the table from time to time by manipulating the treadle rod 35. And, in order to trim off the fin properly, it is also customary to vary the inclination of the table at times by manipulating the handle 36.

Extending in front of the upper cutter 9 is a stationary guard 49 the lower edge of which is located above the plane of the table far enough to permit the overflow to be presented beneath it to the cutters, said guard being arranged to engage that face of the heel from which the overflow projects and serving to prevent the cutters from damaging the heel proper.

It is desirable that means be provided for aiding the operator in guiding and feeding the heel across the surface of the table; and to this end a feed wheel 50 is located behind the shearing plane of the cutters and on that side of the bite of the cutters from which the heel is fed. This feed wheel is fast to the lower end of a spindle 51 rotatable in an upwardly extending bearing member 53 which is integral with a plate 55, the plate being adjustable in a direction parallel to the axes of the cutter shafts and held in adjusted position on the frame of the machine by a screw 57 which passes through a slot in the plate and is threaded into the frame. Fast to the upper end of the spindle 51 is a conical friction member 59 which fits in a conical recess in a pulley 61, the pulley and conical member being held yieldingly in contact by a compression spring 63 the lower end of which bears against the pulley, and the upper end of which bears against a conical cap 65 which is threaded upon the upper end of the spindle 51 and held in adjusted position by a set screw 67. With this friction drive for the feed wheel 50, the normal driving force of the feed wheel may be made weak or strong as may be desired. The pulley 61 is driven by a belt 69 which passes around said pulley, over idle pulleys 71 and around a pulley 73 fast to the shaft 43 of the lower cutter. This feed wheel 50 is so located that its periphery is substantially tangent to the shearing plane of the cutters. The periphery of the wheel is therefore arranged to engage that face of the work which confronts the shearing plane, while the margin of the wheel is arranged to overlap the lip or fin of overflow which projects from the lower edge of said face across said shearing plane. See Fig. 3.

As shown by Fig. 2, the axis of the feed-wheel 50 is inclined and the lower face of the feed-wheel is correspondingly inclined in a direction which insures the insertion of the overflow under it. As a further precaution to insure the passage of a relatively wide or crooked fin of overflow under the feed-wheel the machine is provided with a stationary guard 75 the under surface of which is flush with that of the feed-wheel, the tip of said guard being shaped to conform to the periphery of the feed-wheel and being arranged close to the latter.

Figure 4:
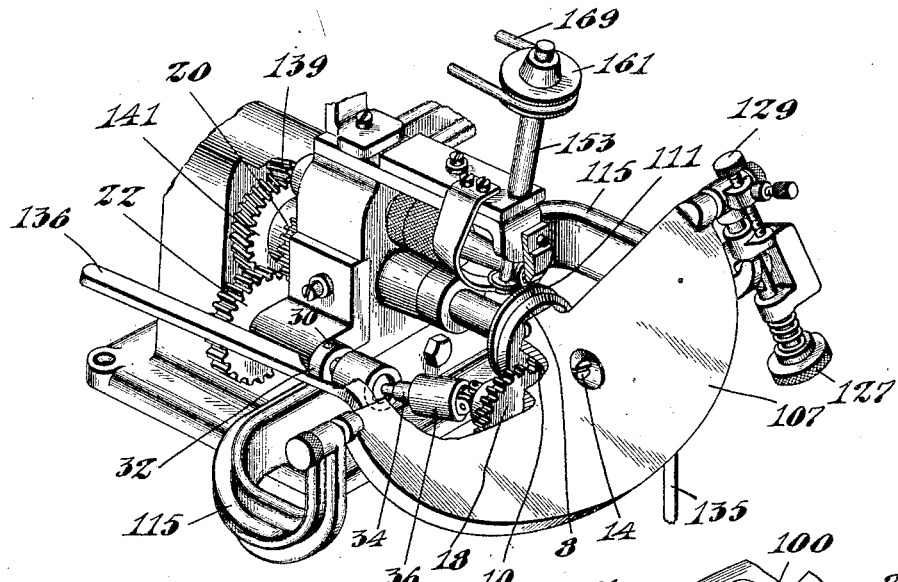
Figure 4 is a perspective of a modification in which a lower feed member is provided.
Figure 6:
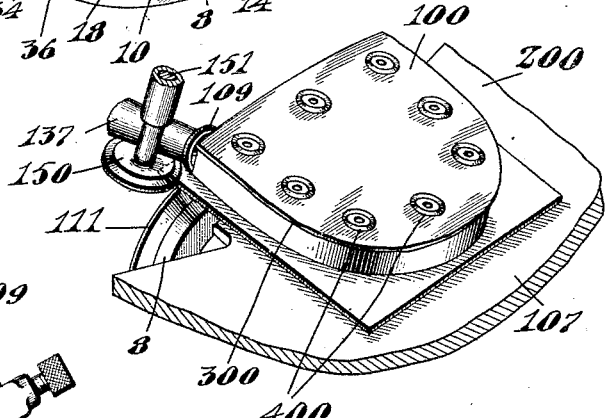
Figure 6 is a perspective showing a rubber heel in process of being trimmed on the machine of Figures 5 and 6.
Figure 5:
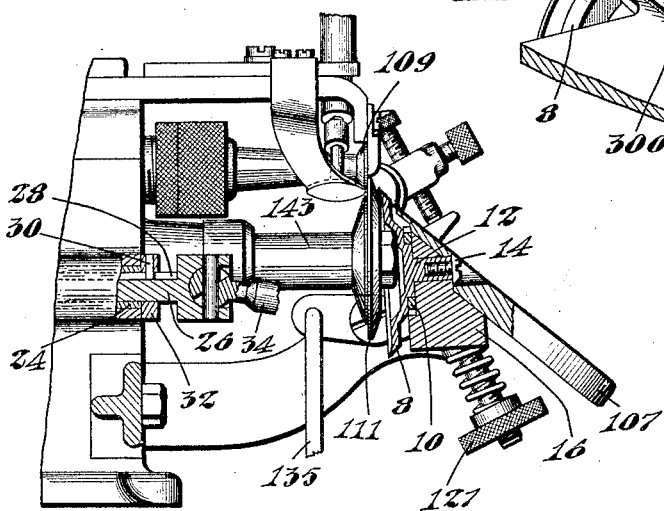
Figure 5 is a front elevation of the working parts of the machine shown in Figure 4.

Referring now more particularly to Figures 4, 5 and 6, there is shown a machine which is of substantially the same construction as that shown in Figures 1, 2 and 3 with the exception of certain additional feeding means. It is believed to be unnecessary to describe in detail the construction of those parts which are substantially like corresponding parts of the machine of Figures 1, 2 and 3. Instead, the principal parts of the machine shown in Figures 4, 5 and 6 which correspond to similar parts in the machine of the first three figures have been given the same reference numerals increased by one hundred.

In this embodiment of the invention, an additional feeding means is provided which is adapted to engage the under side of the heel, this feeding means comprising a dished feed-wheel 8 in front of the cutter 111 but supported by the work-table 107 to partake of all adjustments of the latter. The feed member 8 has rigid with it a gear 10 and a small stem 12 bored to receive a screw 14. The stem is rotatably received in a bearing block 16 which is fast to the under side of the table and is held in place by the screw 14, said screw being inserted through a hole in the table. Meshing with the gear 10 is a gear 18 rotatably mounted on a stud carried by the block 16, so that the gears are always in mesh irrespective of the position into which the table may be adjusted. The mechanism for driving the gear 18 includes a gear 20 on the cutter shaft 143 and articulated connections which compensate for all manner of adjusting movements of which the table 107 is capable. The gear 20 meshes with a gear 22 fast to a hollow shaft 24 (Fig. 5) which is rotatably mounted in a bearing in the frame of the machine. Slidable in the hollow shaft 24 is a shaft 26 having in it a keyway 28 to receive a key 30 in a sleeve 32 which is fast to the end of the hollow shaft 24. The right-hand end of the sliding shaft 26 is connected by a ball-and-socket joint with the left-hand end of a short shaft 34, the right-hand end of which is connected by a universal joint 38 with a stud projecting from the gear 18. With the driving mechanism which has just been described, it will be clear that the table 107 may be raised and lowered and swung into different positions about the axis upon which it is hung without interfering with the driving of the feed member 8.

The upper portion of the feed member 8 is slightly above the plane of the upper surface of the table 107 and is therefore in contact with the under side of the heel close to the cutting locality during the trimming operation which is performed on the heel. The feeding of the heel is thus aided not only by the feed wheel 150 but by the feed member 8.

Although the invention has been set forth as embodied in a particular machine, it should be understood that the invention is not limited in the scope of its application to the particular machine which has been shown and described.

Having thus described my invention, what I claim as new and desire to secure by Letters Patent of the United States is:—

1. A machine of the class described having, in combination, a pair of cooperating cutters, a work support over which the work is fed to the cutters, a guard located in front of one of the cutters and spaced above the plane of the work support, and a rotary feed wheel located to engage that face of the work from which a fin of overflow projects at a locality in advance of the cutting locality.

2. A machine for trimming the overflow which projects from a face of a molded rubber heel or similar article having, in combination, a pair of cooperating cutters, an angularly adjustable work support over which the article is fed, a guard located in front of one of the cutters, said guard being spaced above the table sufficiently to permit the overflow from the article to be thrust beneath it into the bite of the cutters, and a rotary feed wheel adapted to engage said face of the article from which the overflow projects.

3. A machine of the class described having, in combination, a cutter, means for operating the cutter, a rotary shear member arranged to cooperate with the cutter, an adjustable work support, a feed member associated with the rotary shear member and carried by the work support, and driving means for the feed member constructed and arranged to be operative in the different positions into which the work support may be adjusted.

4. A machine of the class described having, in combination, a cutter, means for operating the cutter, a rotary shear member arranged to cooperate with the cutter, an angularly adjustable work support, a feed member associated with the rotary shear member and carried by the work support, and driving means for the feed member constructed and arranged to be operative in the different angular positions into which the work support may be adjusted.

5. A machine of the class described having, in combination, a pair of cooperating cutters arranged one above the other, an angularly adjustable work support over which the work is fed to the cutters, a rotary feed member carried by the work support, and means constructed and arranged to rotate the feed member in any of the angular positions into which the work support may be adjusted.

6. A machine of the class described having, in combination, a pair of cooperating rotary cutters arranged one above the other, a work support over which the work is fed to the cutters, and a rotary dished feed member located in front of the lower cutter and arranged to engage the under side of the work.

7. A machine for trimming the overflow which projects from a face of a molded rubber heel or similar article having, in combination, a pair of cooperating cutters arranged one above the other, an angularly adjustable work support over which the work is fed to the cutters, a guard for the upper cutter spaced above the work support sufficiently to permit the overflow from the article to be presented to the cutters, a rotary feed member carried by the work support, and means constructed and arranged to rotate the feed member in any of the angular positions into which the work support may be adjusted.

8. A machine of the class described having, in combination, a cutter, means for operating the cutter, a shear member arranged to cooperate with the cutter, a work support over which the work is fed, a rotary feed wheel located to engage an edge face of the work at a locality in advance of the locality engaged by the cutter and shear member, and a rotary feed member located adjacent to the shear member and adapted to engage the under face of the work.

9. A machine of the class described having, in combination, a cutter, means for operating the cutter, a shear member arranged to cooperate with the cutter, a work support over which the work is fed, a rotary feed wheel located to engage an edge face of the work at a locality in advance of the locality engaged by the cutter and shear member, and a rotary feed member located adjacent to the shear member, carried by the work support and adapted to engage the under face of the work.

10. A machine for trimming the overflow which projects from a molded rubber heel or similar article having, in combination, a pair of cooperating cutters, an angularly adjustable work support over which the article is fed, a rotary feed wheel arranged to engage an edge face of the article, a rotary feed member carried by the work support and adapted to engage the under face of the article, and means constructed and arranged to drive said last-named feed member while permitting adjustment of the work support.

11. A machine of the class described having, in combination, a pair of trimming cutters arranged in shearing relation, a rotary feed wheel the periphery of which is arranged to engage the perimetral face of an article of work, the margin of said wheel being arranged to overlap a fin of surplus material projecting from said face of the work across the plane of the shearing cut, and a guard arranged to engage such fin to insure its passage under said wheel.

12. A machine for trimming overflow from a molded article of rubber, comprising trimming means, a work-support adjustable relatively to said means, a feed-wheel supported by said work-support to partake of adjustments thereof and arranged to act on the work, and mechanism for driving said feed wheel, said mechanism being articulated to compensate for adjusting movement of said work-support.

13. A machine for trimming overflow from a molded article of rubber, comprising trimming means, a work-support adjustable about an axis and otherwise adjustable relatively to said means, a feed-wheel supported by said work-support to partake of all adjustments thereof and arranged to feed the work past said trimming means, and mechanism for driving said feed-wheel, said mechanism including a universal driving connection to compensate for various adjusting movements of said work-support.

14. A machine for trimming overflow from a molded article of rubber, comprising trimming means, a power-driven feed-wheel arranged to feed the work by engagement with that face which confronts the trimming means, and a power-driven feed-wheel arranged to feed the work by engagement with another face thereof.

15. A trimming machine comprising a pair of cutters constructed and arranged to cooperate in shearing relation, means arranged to support an article of work for feeding movement past the cutters in front of the shearing plane of said cutters, and a work-guiding member arranged behind said plane but having a work-engaging surface tangent thereto at the feeding-in side of the shearing locality.

16. A trimming machine comprising a pair of cutters arranged to cooperate in shearing relation, a feed wheel arranged wholly at one side of the shearing plane of said cutters but having its periphery tangent to said plane at a point adjacent to the shearing locality, and means for driving said wheel to feed the work.

17. A trimming machine comprising a pair of rotary cutting disks arranged in cooperative shearing relation, means for driving said disks, means arranged to support an article of work in front of the plane of the shearing cut, and a rotary work-guiding member arranged wholly behind said plane and at the feeding-in side of the shearing locality, said member being arranged to permit a fin of overflow to project across said plane from the article of work and the periphery of said member being tangent to said plane and arranged to engage that face of the article from which the fin of overflow projects.

In testimony whereof I have signed my name to this specification.

JAMES A. BROGAN.